(No Model.)

C. W. SHARTLE.
SLIP COLLAR FOR PULLEYS.

No. 394,729. Patented Dec. 18, 1888.

WITNESSES:
Theo. Rolle
Wm. N. Moore

INVENTOR:
Charles W. Shartle
BY Gjedertheim & Putner
ATTORNEYS.

(No Model.)
C. W. SHARTLE.
SLIP COLLAR FOR PULLEYS.
No. 394,729.
2 Sheets—Sheet 2.
Patented Dec. 18, 1888.
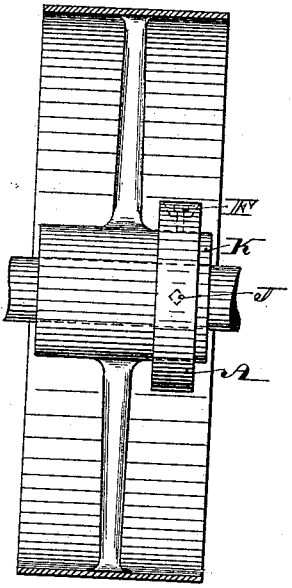
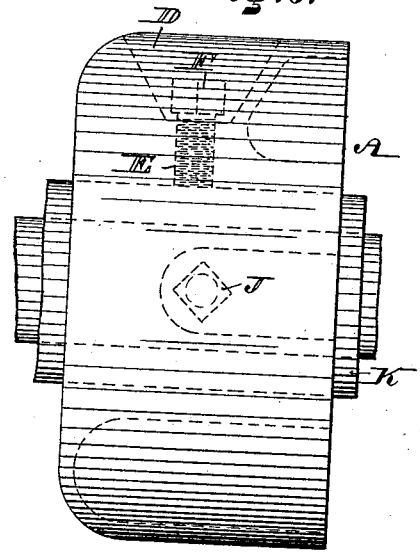
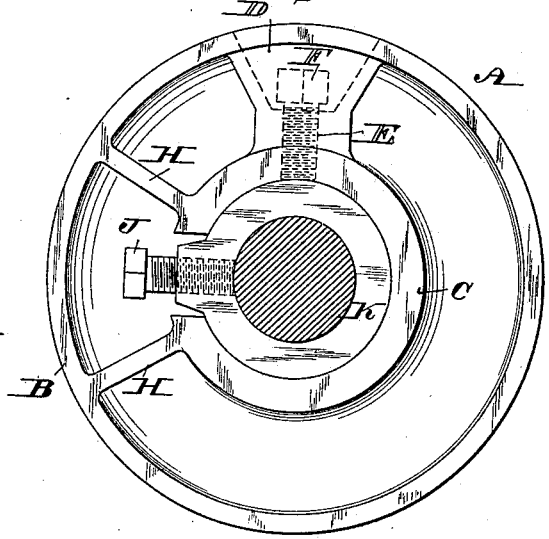
WITNESSES:
INVENTOR
Charles W. Shartle
BY
ATTORNEYS.

UNITED STATES PATENT OFFICE.

CHARLES W. SHARTLE, OF MIDDLETOWN, OHIO.

SLIP-COLLAR FOR PULLEYS.

SPECIFICATION forming part of Letters Patent No. 394,729, dated December 18, 1888.

Application filed March 12, 1888. Serial No. 267,006. (No model.)

*To all whom it may concern:*

Be it known that I, CHARLES W. SHARTLE, a citizen of the United States, residing at Middletown, in the county of Butler, State of Ohio, have invented a new and useful Improvement in Slip-Collars for Pulleys, Shafts, &c., which improvement is fully set forth in the following specification and accompanying drawings.

My invention relates to improvements in slip-collars for pulleys, shafts, &c.; and it consists, first, in the construction of the same, as herein set forth and claimed, whereby the heads of the fastening-screws are removed from liability of contact with the belts, and are thus not liable to be broken off.

It further consists of the details in the construction of a slip-collar, whereby the weight of the same is materially lessened with little, if any, diminution of the strength of the same, all of which features are fully set forth in the following description and claims, and illustrated in the accompanying drawings, in which—

Figure 1:
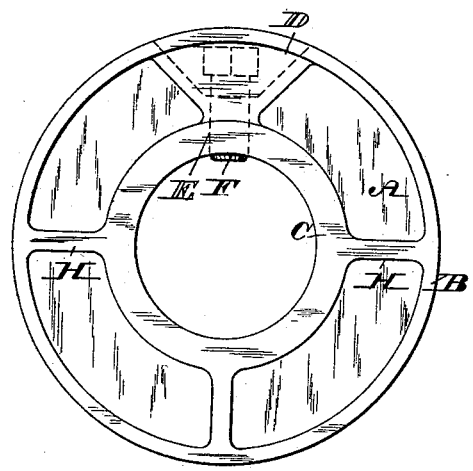
Figure 2:
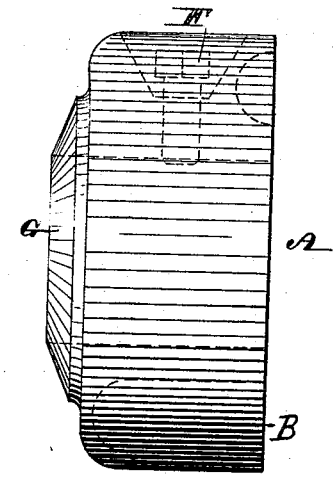
Figure 3:
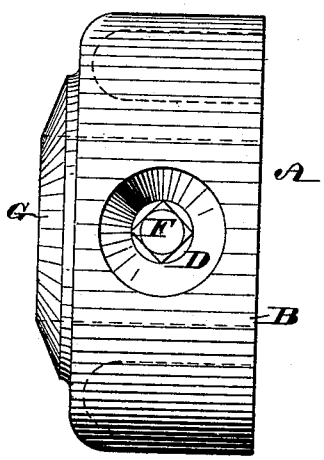
Figure 4:
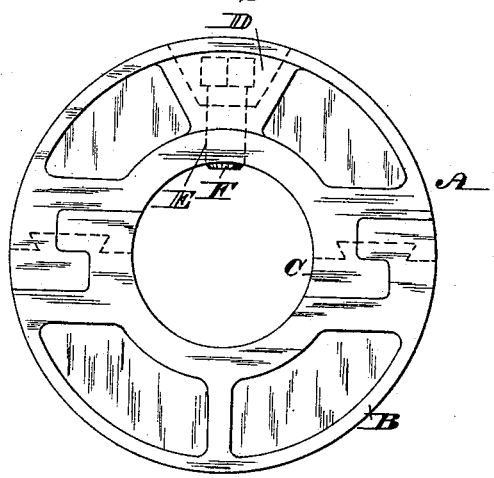

Figure 1 represents an end view of a slip-collar embodying my invention. Fig. 2 represents a side view of the same. Fig. 3 represents a plan view of the collar shown in Figs. 1 and 2. Fig. 4 represents a split collar having the features of my invention. Fig. 5 represents a pulley having on its hub a slip-collar embodying my invention. Figs. 6 and 7 represent side and end views, respectively, of a modification of my invention, wherein the collar is split, so as to allow the passage of the fastening-screw of the hub of the pulley.

Similar letters of reference indicate corresponding parts in the several figures.

Referring to the drawings, Figs. 1, 2, 3, and 4, A represents a slip-collar for sustaining a pulley or shaft lengthwise or retaining it in the proper place in its bearings, the same, excepting the features of my invention applied thereto, being of usual construction. As a part of the collar and cast with it is a rim, B, which is parallel with and encircles or circumscribes the flange C of the collar, the said collar being cast with one side closed—as to the portion between the rim B and the flange C—leaving the opposite side open, presenting, however, in general respects the appearance of a solid collar.

D represents a cup, which is cast with the rim B and flange C coincident with the opening E, in which the clamping or securing screw F is fitted, the head of said screw being within said cup.

By constructing the collar with a rim and flange, as described, it is much lighter, while at the same time its strength is not materially decreased, and by having the cup within the rim the head of the fastening-screw does not project beyond the periphery of the rim, whereby it is not liable to be struck and broken off or catch the belts or clothes, hands, &c., of the workman, this construction also admitting of the use of a screw having a squared or angular head.

On the side of the collar is a flange or lateral projection, G, of conical form, presenting a small surface on its outer edge, which, as will be seen, prevents the entire surface of said side from coming in contact with a contiguous collar, pulley, or other object, thus reducing friction between the parts.

In order to strengthen the connection of the rim B with the collar A, ribs H are cast with said rim and the flange C, the cup D, also, in a measure, acting as a rib.

My invention is also applicable to split collars or pulleys, as seen in Fig. 4.

In Fig. 5 there is shown a pulley or wheel to which the invention is applicable.

In Figs. 6 and 7 the hub of the collar is split in longitudinal direction, so as to allow the passage of the set-screw J of the inner wheel or pulley hub, K, in applying and removing the slip-collar over said wheel or pulley hub. I may also employ my invention on the hubs of wrought-iron, steel-rim, and wood split pulleys, as well as on complete pulleys, and with equal advantage.

Having thus described my invention, what I claim as new, and desire to secure by Letters Patent, is—

1. A collar or device of like character, consisting of a hollow casting having a circumferential rim and an inner flange forming a bearing and having one of its ends closed as to the portion between the said rim and inner flange, substantially as described.

2. A slip-collar for a pulley, shaft, or like devices, consisting of a hollow body having a circumferential rim and an inner flange and a cup connected to said rim and within the same, substantially as described.

3. A slip-collar for a pulley, shaft, or like devices, having a circumferential rim and an inner flange, the latter forming a bearing either for the shaft or the hub of the pulley, and a cup connected to and within said rim and having an opening in its base corresponding to an opening in the flange, substantially as and for the purpose set forth.

4. A slip-collar for a pulley, shaft, or like devices, having a circumferential rim with a cup, an inner flange, and ribs connecting said rim and flange, substantially as described.

5. A slip-collar for a pulley, shaft, or like devices, having a split inner flange or hub and a circumferential rim, the split inner flange forming a bearing for the hub of the pulley, substantially as described.

6. A slip-collar for a pulley, shaft, or like device, consisting of a casting having a circumferential rim, an inner annular flanged portion forming a bearing, and a conical side projection, substantially as described.

CHARLES W. SHARTLE.

Witnesses:
JOHN FERRIS,
W. H. TODHUNTER.